United States Patent [19]

Minagawa et al.

[11] 4,136,081
[45] Jan. 23, 1979

[54] 2,2,6,6-TETRAMETHYL-4-PIPERIDYL CARBOXYLIC ACID ESTERS OF ALIPHATIC TETRACARBOXYLIC ACIDS AS STABILIZERS FOR SYNTHETIC POLYMERS

[75] Inventors: Motonobu Minagawa, Kosigaya; Naohiro Kubota; Toshihiro Shibata, both of Urawa, all of Japan

[73] Assignee: Argus Chemical Corporation, Brooklyn, N.Y.

[21] Appl. No.: 736,288

[22] Filed: Oct. 28, 1976

[30] Foreign Application Priority Data

Nov. 19, 1975 [JP] Japan .................. 50-139086

[51] Int. Cl.² .................. C08K 5/34; C07D 211/6
[52] U.S. Cl. .................. 260/45.8 N; 546/19; 546/188; 546/189; 546/242
[58] Field of Search .................. 260/45.8 N, 293.63, 260/293.64, 45.8 NT, 45.8 NZ, 293.67, 293.58, 293.81

[56] References Cited

U.S. PATENT DOCUMENTS

| | | | |
|---|---|---|---|
| 3,640,928 | 2/1972 | Murayama et al. | 260/45.8 N |
| 3,840,494 | 10/1974 | Murayama et al. | 260/293.63 |
| 3,899,464 | 8/1975 | Murayama et al. | 260/45.8 NZ |
| 3,960,809 | 6/1976 | Ramey et al. | 260/45.8 NT |
| 4,021,432 | 5/1977 | Holt | 260/45.8 N |

FOREIGN PATENT DOCUMENTS 1080335  8/1967  United Kingdom.

Primary Examiner—V. P. Hoke

[57] ABSTRACT

2,2,6,6-tetramethyl-4-piperidyl carboxylic acid esters of aliphatic tetracarboxylic acids are provided, useful as stabilizers for organic polymeric materials, and having the general formula:

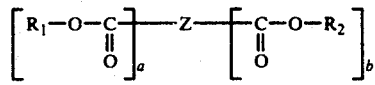

wherein:

$R_1$ is selected from the group consisting of

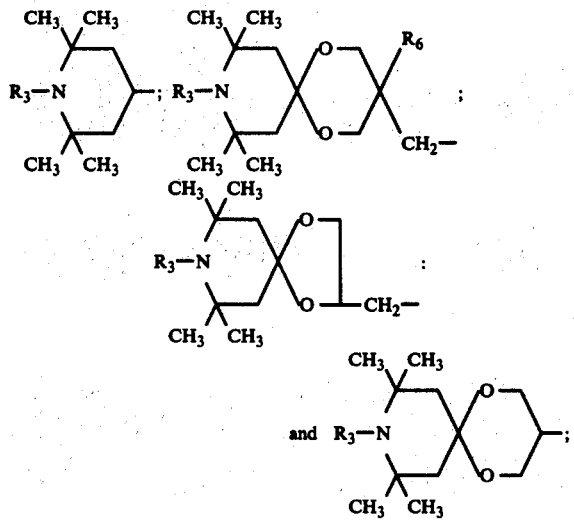

and when a is 2, 3, or 4, the $R_1$ groups can be the same or different;

$R_2$ is selected from the group consisting of hydrogen; alkyl; alkenyl; cycloalkyl; alkcycloalkyl; cycloalkalkyl; aryl; aralkyl; and alkaryl; and when b is 2 or 3, the $R_2$ groups can be the same or different;

$R_3$ is selected from the group consisting of hydrogen and O;

$R_6$ is lower alkyl;

a is selected from the group consisting of 1, 2, 3 and 4;

b is selected from the group consisting of 0, 1, 2 and 3;

a + b is equal to 4; and Z is a tetravalent aliphatic or cycloaliphatic radical carrying four

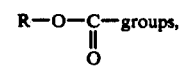

where R is $R_1$ or $R_2$, and can include from one to three hydroxyl groups OH.

30 Claims, No Drawings

2,2,6,6-TETRAMETHYL-4-PIPERIDYL CARBOXYLIC ACID ESTERS OF ALIPHATIC TETRACARBOXYLIC ACIDS AS STABILIZERS FOR SYNTHETIC POLYMERS

Hindered 2,2,6,6-tetraalkyl-4-carboxylic acid ester piperidine compounds have been proposed by Murayama et al U.S. Pat. No. 3,640,928 patented Feb. 8, 1972 as light and heat stabilizers for synthetic polymers, such as polyolefins, polyvinyl chloride, polyvinylidene chloride, polyurethanes, and polyamides. These compounds have the general formula:

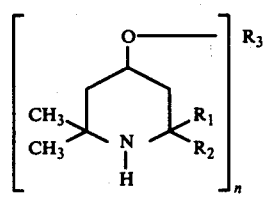

or a salt thereof.

In the above Formula:

$R_1$ and $R_2$ which may be the same or different, each are an alkyl group such as methyl, ethyl, isopropyl or dodecyl, or they form, together with the carbon atom to which they are attached, a saturated alicyclic group such as:

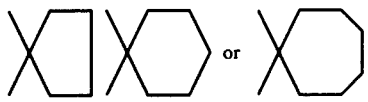

or a group of the formula

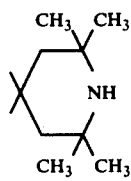

n is an integer of 1 to 3 inclusive: and
$R_3$ is an acyl group.

These compounds have proved to be particularly acceptable because they do not impart a discoloration of their own to the synthetic polymer. The compounds generally employed previously have either been highly colored, such as the nickel compounds (which are normally green) and the 2-hydroxybenzophenones (which are varying shades and intensities of yellow). They also show very little tendency towards sublimation and exudation, and they have an excellent stabilizing action against both heat and light deterioration.

Consequently, the Murayama et al patent has been followed by a large number of patent and literature disclosures by Murayama et al and others of compounds including a 2,2,6,6-tetrasubstituted-4-piperidyl group attached to a base molecule of varying structures.

Murayama et al. U.S. Pat. No. 3,898,303 patented Aug. 5, 1975 propose piperidino-spiro-hydantoin derivatives having the formula:

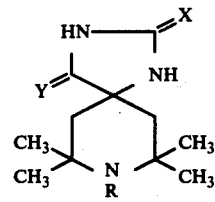

wherein
R represents an alkyl group, an alkenyl group, an alkenoyl group which may be substituted with an aryl group, a hydroxyalkyl group, an alkoxyalkyl group, an alkoxycarbonylalkyl group, an acyloxyalkyl group, a cyanoalkyl group or nitroso group, and X and Y individually represent oxygen atom or sulfur atom.

Murayama et al. in U.S. Pat. No. 3,899,464 patented Aug. 12, 1975 disclose a variation of the piperidino spiro compounds having the formula:

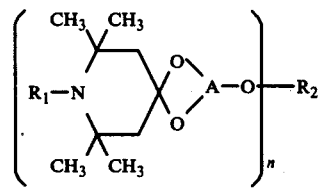

wherein
$R_1$ represents hydrogen atom, an alkyl group, a substituted alkyl group, an alkenyl group, an alkynyl group, a substituted or unsubstituted aralkyl group, an aliphatic acyl group, an alkoxycarbonyl group or an aralkoxycarbonyl group, n is an integer of 1 to 4;

when n is 1, $R_2$ represents hydrogen atom, an aliphatic, aromatic or heterocyclic monoacyl group, an alkyl group, an alkenyl group, an alkynyl group, an aralkyl group, an aryl group, an alkoxyalkyl group, an epoxyalkyl group, an alkoxysulfonylalkyl group, N-substituted carbamoyl group, a N-substituted thiocarbamoyl group, a monovalent group from an oxoacid or group

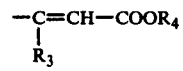

in which
$R_3$ represents hydrogen atom, a lower alkyl group or phenyl group and $R_4$ represents an alkyl group;

when n is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid;

when n is 3, $R_2$ represents an aromatic triacyl group or a trivalent group from an oxoacid; and when n is 4, $R_2$ represents an aromatic tetraacyl group, and A represents a group

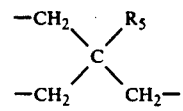

in which $R_5$ represents hydrogen atom or a lower alkyl group or, when n is 1, $R_5$ may represent together with $R_2$ a group

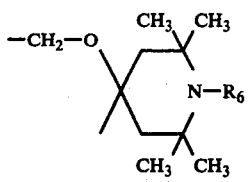

in which $R_6$ represents the same group as defined in $R_1$ and may be the same or different from $R_1$, or a group

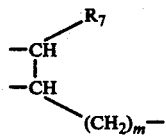

in which m is 1 or 2 and $R_7$ represents hydrogen atom or, when n and m are 1, $R_7$ represents methylene group together with $R_2$.

Murayama et al. U.S. Pat. No. 3,933,735 patented Jan. 20, 1976 propose 4-piperidone derivatives having a structure similar to the 4-piperidyl derivatives, but with a keto oxygen at the 4-position of the piperidine ring.

Murayama et al. U.S. Pat. No. 3,941,744 patented Mar. 2, 1976, disclose another variation of the piperidino spiro derivatives having the formula:

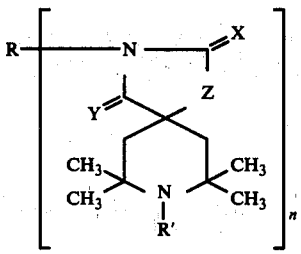

wherein

R' represents an alkyl group, a substituted alkyl group, an acyl group, an alkoxycarbonyl group, a substituted alkoxycarbonyl group, an amino group, a substituted amino group or nitroso group;

X represents oxygen atom or sulfur atom;

Y represents oxygen atom, sulfur atom or a group of the formula =N—R'' in which R'' is hydrogen atom, an alkyl group or a substituted alkyl group;

Z represents oxygen atom or a group of the formula >N—R''' is hydrogen atom, an alkyl group or a substituted alkyl group;

n is an integer of 1 through 4 inclusive; and

R represents, when n is 1, an alkyl group, a substituted alkyl group, an aryl group, a substituted aryl group, a cycloalkyl group, an alkoxycarbonyl group, a substituted alkoxycarbonyl group, a substituted phosphino group or a substituted phosphinyl group, when n is 2, an alkylene group, an alkenylene group, an arylene group, a substituted arylene group, an aralkylene group, an alkylenediphenylene group, a bis-(acyloxyalkylene) group, an alkylene-bis-(oxycarbonylalkyl) group, a dialkylene ether group or a diphenylene ether group, when n is 3, an alkanetriyl group, a tris-(acyloxyalkylene) group, an alkane-tris-(oxycarbonylalkyl) group or a group of the group

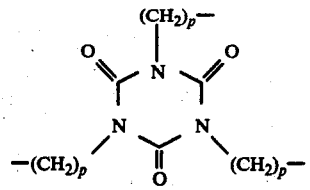

in which p is an integer of 1 through 8 inclusive, and when n is 4, an alkane tetrayl group, a tetrakis-(acyloxyalkylene) group or an alkanetetrakis(oxycarbonylalkyl) group.

Murayama et al. U.S. Pat. No. 3,940,363 patented Feb. 24, 1976 disclose a further variation in which two 2,2,6,6-tetrasubstituted-4-piperidyl groups are linked together via the ring nitrogen atom to an R' alkylene linking group, which may be interrupted with an oxygen or sulfur atom, an alkenylene group, an alkynylene group, an aralkylene group, an aliphatic diacyl group, a group having the formula:

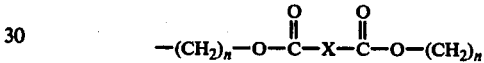

in which n is an integer of 1 or 2 and X is an alkylene group, or o-, m- or p-phenylene group or the carbon atoms of CO groups may be directly joined in the absence of X or a group of the formula:

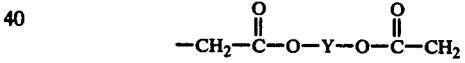

in which

Y is an alkylene group or o-, m- or p-phenylene group.

Ramey et al U.S. Pat. Nos. 3,899,491, patented Aug. 12, 1975 and 3,920,659, patented Nov. 18, 1975, disclose alkyl alkanoate derivatives of substituted piperazines and substituted piperazinodiones. The substituted piperazines of U.S. Pat. No. 3,899,491 have the formula:

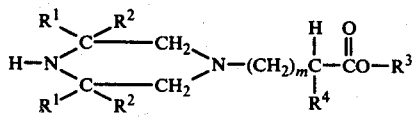

wherein $R^1$ and $R^2$ are methyl or together with the carbon to which they are bound form a mono-cyclic ring system having five or six carbon atoms;

$R^3$ is an alkyl group of from one to twenty atoms;

$R^4$ is hydrogen or methyl, and m is 0 or 1.

The substituted piperazinodiones of U.S. Pat. No. 3,920,659 have the formula:

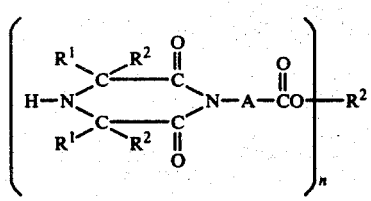

wherein $R^1$ and $R^2$ are independently of each other methyl or ethyl or together with the carbon to which they are bound form a cyclopentyl or cyclohexyl ring, which is unsubstituted or substituted with a methyl group;

n is an integer of from 1 to 2;

when n is 1, $R^3$ is an alkyl group of from one to twenty carbon atoms;

when n is 2, $R^3$ is an alkylene group of from two to eight carbon atoms; and

A is a straight or branched chain (lower) alkylene group containing from one to six carbon atoms with the limitation that the terminals of said alkylene group bear only hydrogen or one (lower) alkyl group.

Ramey et al. U.S. Pat. No. 3,920,661 patented Nov. 18, 1975 disclose dicarboxylic acids and salts in which one carboxylic acid group is esterified with a 2,2,6,6-tetrasubstituted-4-hydroxy piperidine and having the formula:

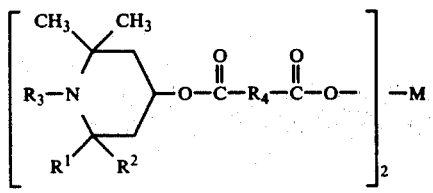

wherein $R_1$ and $R_2$ independently of each other are straight- or branched-chain alkyl having from one to six carbon atoms, or together with the carbon to which they are bound form a cyclopentyl or cyclohexyl ring, which is unsubstituted or substituted with a methyl group;

$R_3$ is hydrogen, alkyl having one to twelve carbon atoms, $\beta$-methoxyethyl, alkenyl having three or four carbon atoms, propargyl, benzyl or alkyl-substituted benzyl;

$R_4$ is straight or branched-chain alkylene having five to eight carbon atoms, or the group $(CH_2)_m Y(CH_2)_n$ wherein Y is oxygen or sulfur and m and n independently of each other are an integer from 1 to 3;

M is hydrogen or a metal selected from the group consisting of barium, nickel, manganese, calcium, zinc, iron, sodium, cobalt, tin, and dialkyl tin, and z has a value of from 1 to 4, the value of z being the same as the available valence of M.

Ramey et al. U.S. Pat. No. 3,939,163 patented Feb. 17, 1976 disclose closely similar compounds in which $R_4$ is alkylene having from one to four carbon atoms.

Randell et al. U.S. Pat. No. 3,939,170 patented Feb. 17, 1976 disclose dehydropyridinyl sulphides, sulphoxides and sulphones having the formula:

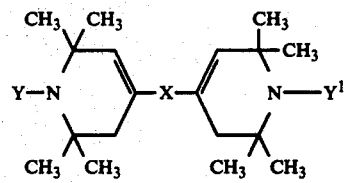

wherein

X is S, SO or $SO_2$ and Y and $Y^1$ are the same or different and each is H, OH, O— or a straight- or branched alkyl residue having from one to four carbon atoms, and salts thereof when Y and $Y^1$ are other than O—.

Randell et al. in published patent application No. B408,123 published April 13, 1976 disclose substituted piperidine-4-ols having the formula:

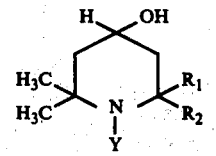

wherein $R_1$ and $R_2$ are the same or different and each is a straight- or branched alkyl residue having from one to twelve carbon atoms, or $R_1$ and $R_2$, together with the carbon atom to which they are attached, form a cycloalkyl residue having from five to twelve carbon atoms or the group:

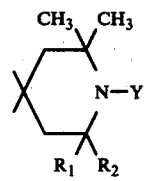

wherein $R_1$ and $R_2$ have their previous significance and Y is a straight- or branched alkyl residue having from one to twenty cabon atoms, an alkenyl or alkynyl residue having from three to twenty carbon atoms, an aralkyl residue having from seven to twelve carbon atoms or the group —$CH_2X$ wherein X is the group

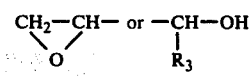

wherein $R_3$ is hydrogen, a methyl or phenyl residue, the group

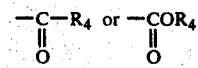

wherein $R_4$ is an alkyl residue having from one to twenty carbon atoms.

Cook U.S. Pat. No. 3,929,804 patented Dec. 30, 1975 discloses 4-piperidine acetamide compounds having the formula:

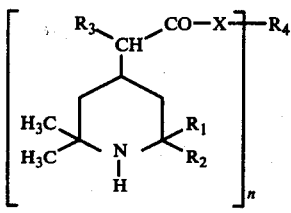

wherein $R_1$ and $R_2$ are the same or different and each is a straight- or branched alkyl residue having from one to twelve carbon atoms, or $R_1$ and $R_2$, together with the carbon atom to which they are attached form a cycloalkyl group having from five to twelve carbon atoms;

$R_3$ is hydrogen, a straight- or branched alkyl residue having from one to four carbon atoms, an aralkyl residue having from seven to nine carbon atoms or a cycloalkyl group having from five to six carbon atoms;

$R_4$ is a metal ion or a hydrocarbyl residue having from two to twenty carbon atoms and being either unsubstituted or substituted by halogen or interrupted by one or more oxygen or sulphur atoms;

X is —O—, —S—, or >$NR_5$, wherein $R_5$ has the same significance as $R_3$; and n is 2, 3 or 4; as well as salts of the amine function of the compounds of formula I.

Cook U.S. Pat. No. 3,939,168 patented Feb. 17, 1976 discloses closely similar compounds having a Y substituent on the piperidyl nitrogen atom, Y being alkyl, alkenyl, aralkyl or a group

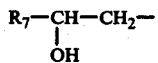

wherein $R_7$ is hydrogen, alkyl or phenyl.

In accordance with the instant invention, 2,2,6,6-tetramethyl-4-piperidyl carboxylic acid esters of aliphatic tetracarboxylic acids are provided, useful as stabilizers for organic polymeric materials, and having the general formula:

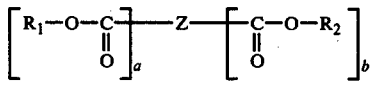

wherein:

$R_1$ is selected from the group consisting of

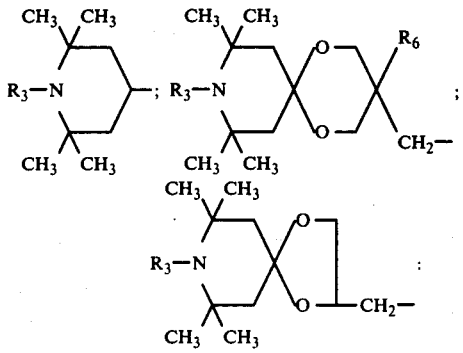

-continued

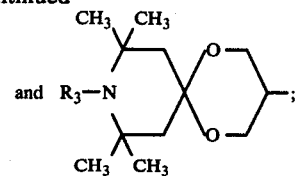

and when a is 2, 3, or 4, the $R_1$ groups can be the same or different;

$R_2$ is selected from the group consisting of hydrogen; alkyl; alkenyl; cycloalkyl; alkcycloalkyl; cycloalkalkyl; aryl; aralkyl; and alkaryl; and when b is 2 or 3, the $R_2$ groups can be the same or different;

$R_3$ is selected from the group consisting of hydrogen and O;

$R_6$ is lower alkyl;

a is selected from the group consisting of 1, 2, 3 and 4;

b is selected from the group consisting of 0, 1, 2 and 3;

a + b is equal to 4; and

Z is a tetravalent aliphatic or cycloaliphatic radical carrying four

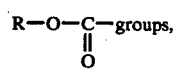

where R is $R_1$ or $R_2$, and can include from one to three hydroxyl groups OH.

The $R_2$ and $R_6$ alkyl have from one to about six carbon atoms. Exemplary are methyl, ethyl, n-propyl, isopropyl, n-butyl, isobutyl, tertiary butyl, secondary butyl, n-amyl, isoamyl, tertiary amyl, n-hexyl, isohexyl, secondary hexyl and tertiary hexyl.

The $R_2$ alkenyl have from two to about six carbon atoms. Exemplary alkenyl include propenyl -2; butenyl -2 and -3; pentenyl -2, -3, and -4, and hexenyl -2, -3, -4, and -5.

The $R_2$ cycloalkyl, alkcycloalkyl and cycloalkalkyl have from about four to about fourteen carbon atoms, and include cyclobutyl, cyclopentyl, cyclohexyl, cycloheptyl, cyclooctyl, cyclododecyl, methylcyclohexyl, dibutyl cyclohexyl, ethyl cyclopentyl, and trimethyl cyclobutyl.

The $R_2$ aryl have from six to fourteen carbon atoms and include phenyl, naphthyl and phenanthryl.

The $R_2$ aralkyl and alkaryl have from seven to about fourteen carbon atoms, and include benzyl, tolyl, phenethyl, ethylphenyl, propylphenyl, butylphenyl, phenpropyl, phenbutyl, naphthethyl and ethylnapththyl.

The Z radical has from two to about twenty-four carbon atoms in an open chain or cyclic saturated or ethylenically unsaturated structure, or mixed open chain substituted cyclic saturated or ethylenically unsaturated structure. Exemplary are ethylene, propylene, butylene, pentylene, hexylene, octylene, nonylene, decylene, dodecylene, tetradecylene, hexadecylene, octadecylene, cyclopentylene, cyclohexylene, cycloheptylene, ethylidene, 2,2,6,6-tetraethylene cyclohexylene, 1-hydroxyl-2,2,6,6-tetraethylene cyclohexylene.

The following compounds are exemplary:

1.
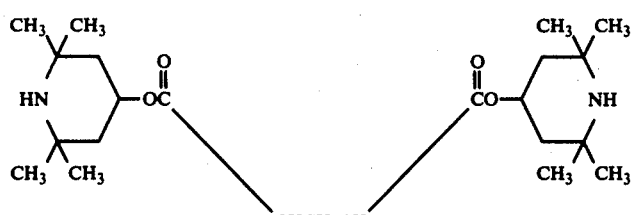
2.
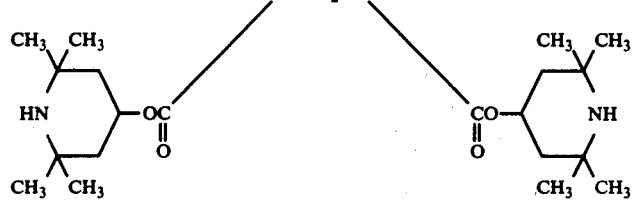
3.
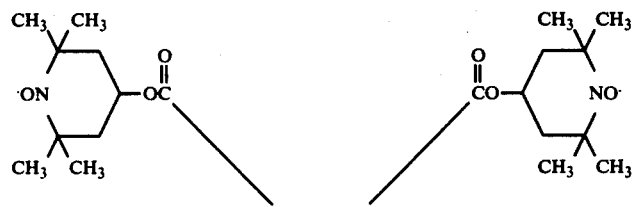
4.
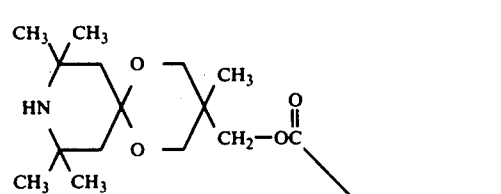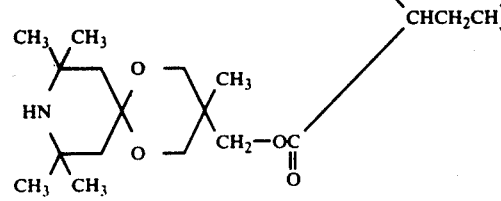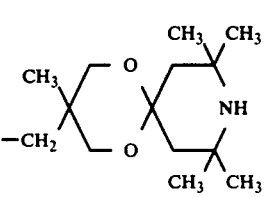

-continued
5.
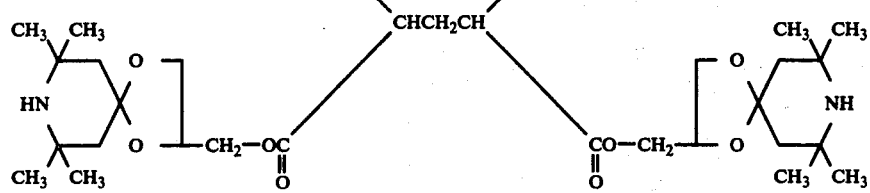
6.
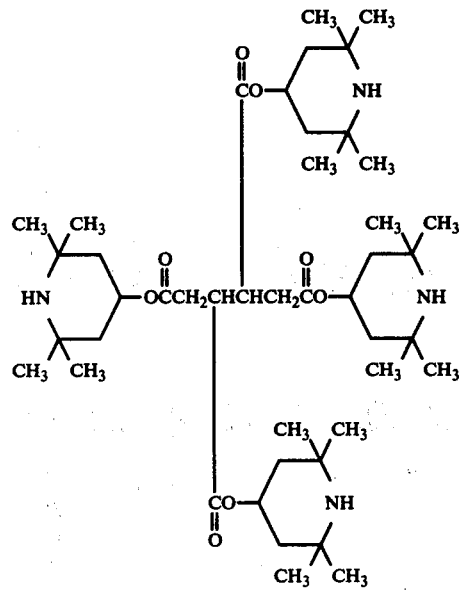
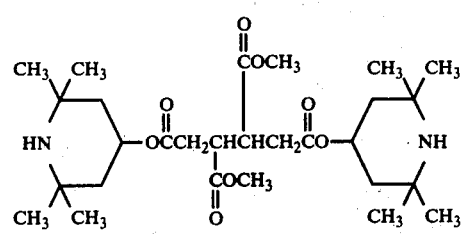
7.

-continued
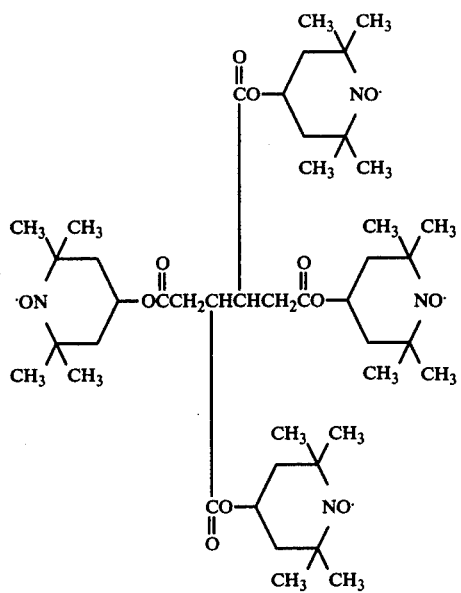
8.
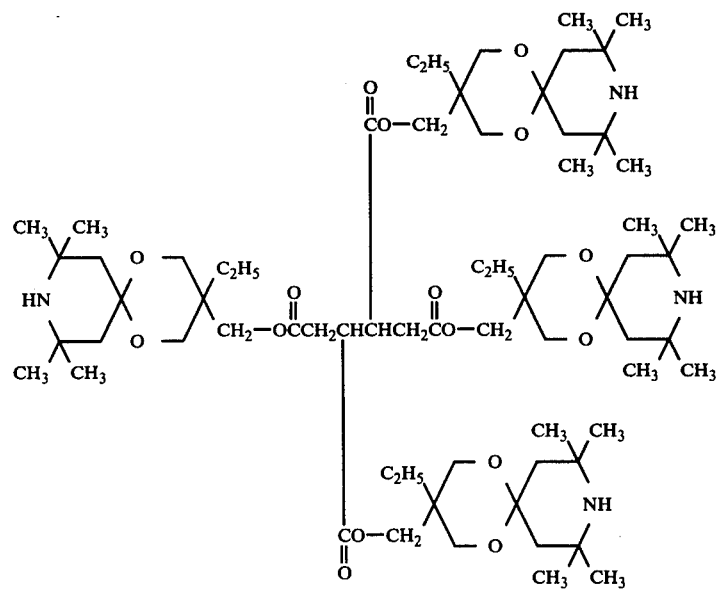
9.

-continued
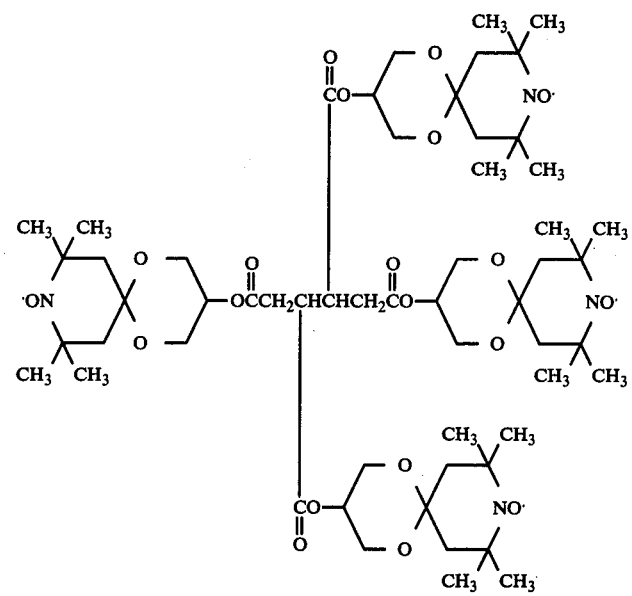 10.
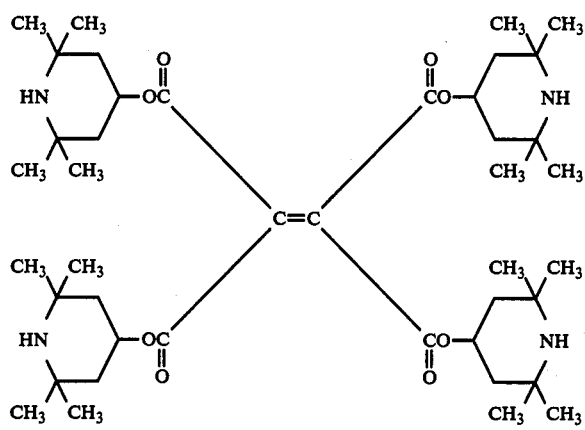 11.
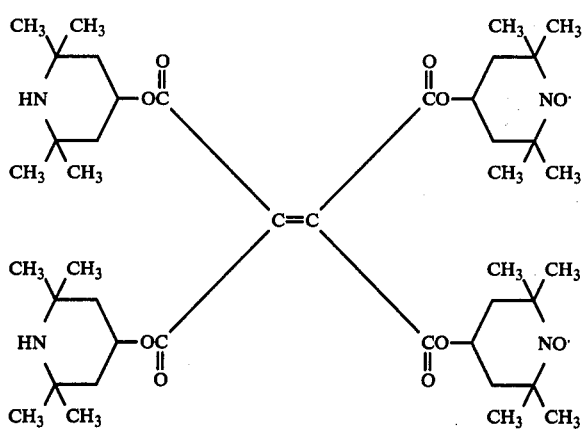 12.

-continued
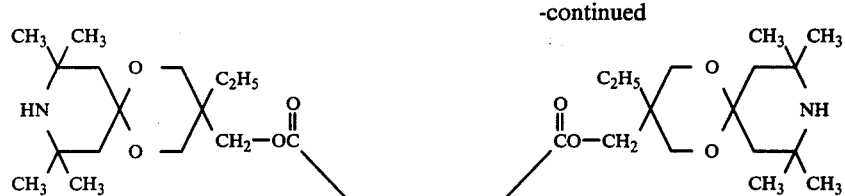 13.
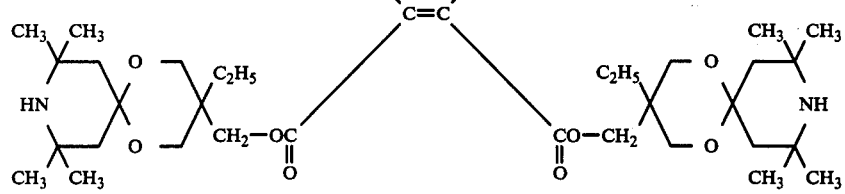
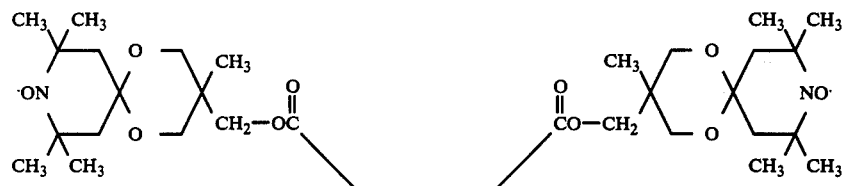 14.
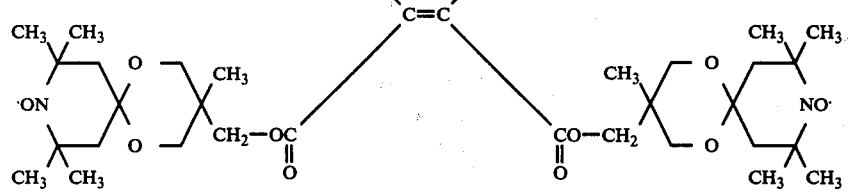
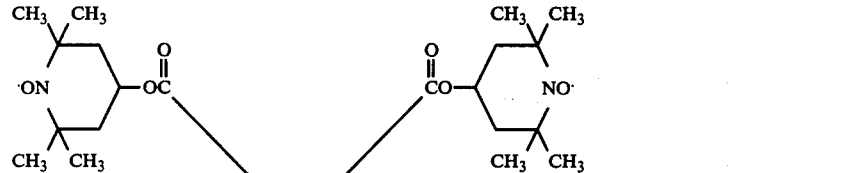 15.
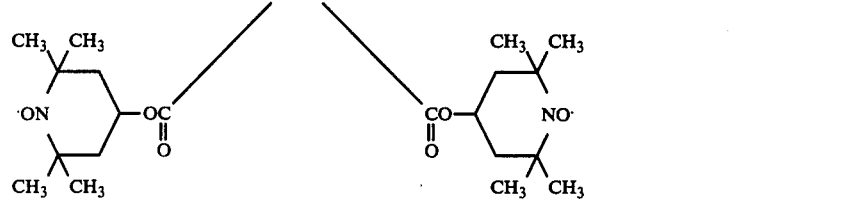
 16.
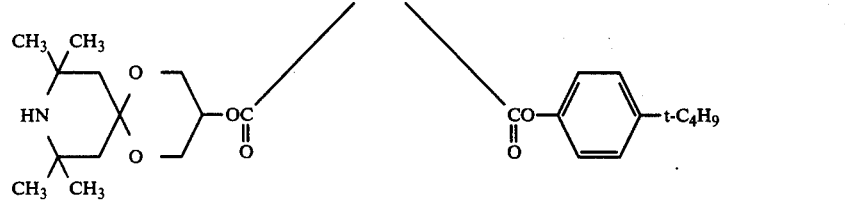

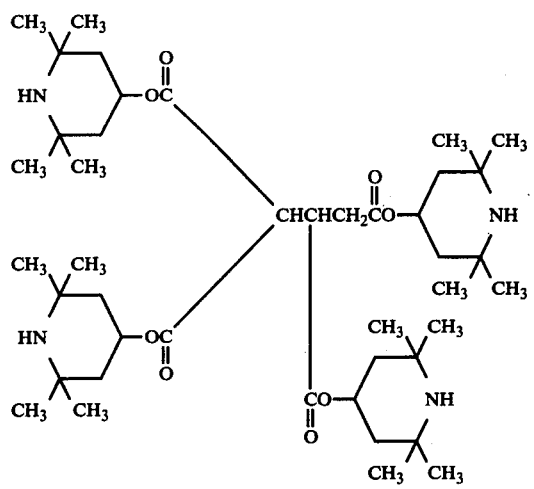
17.
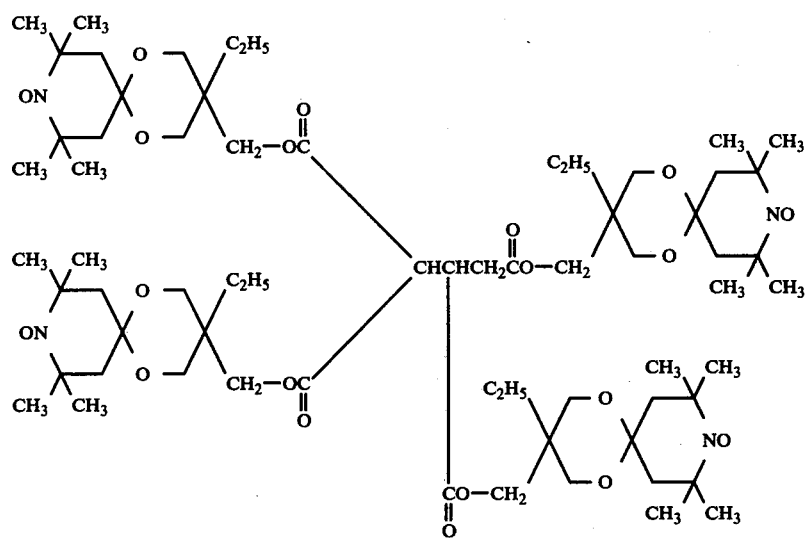
18.
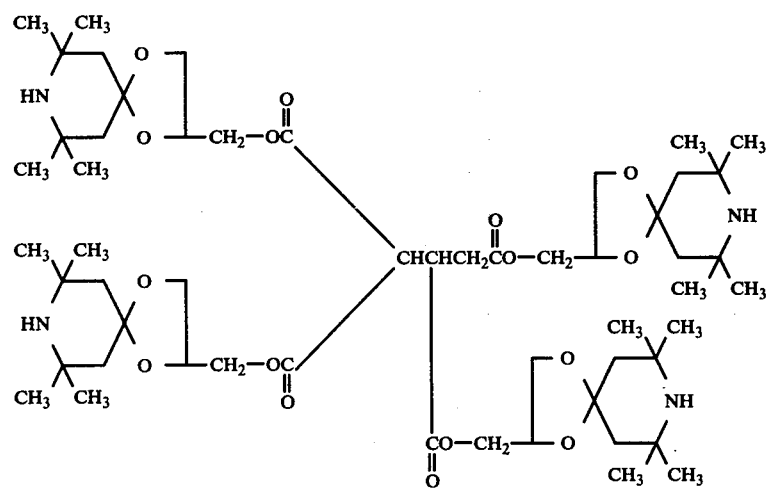
19.

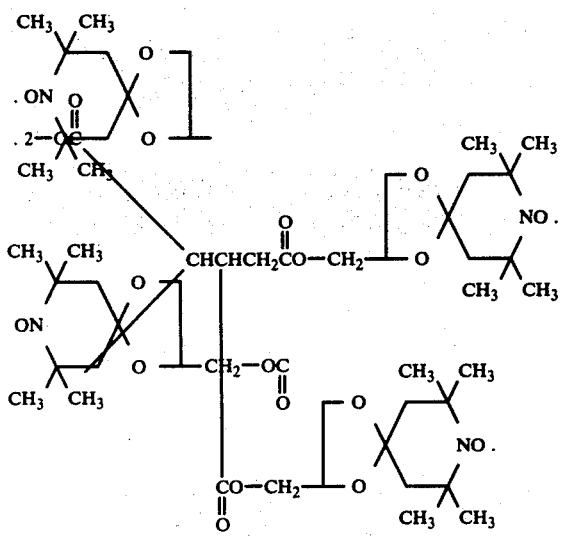
20.
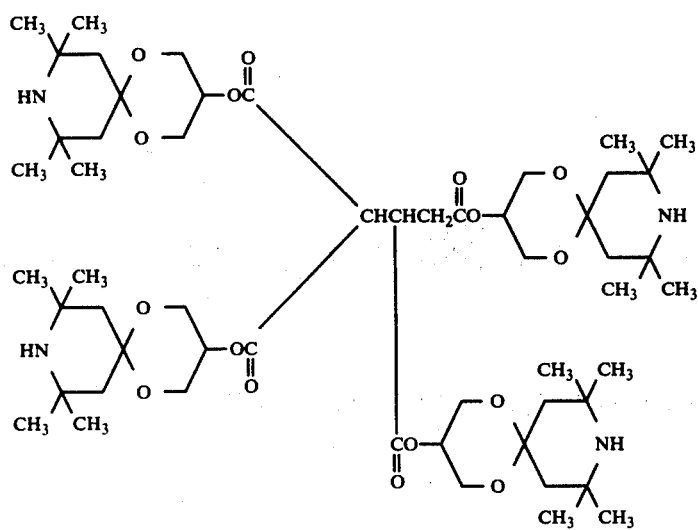
21.
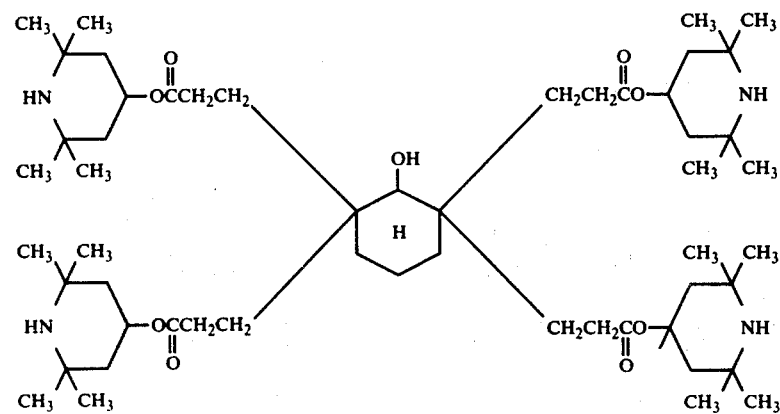
22.

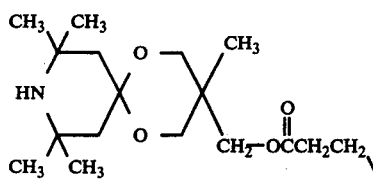
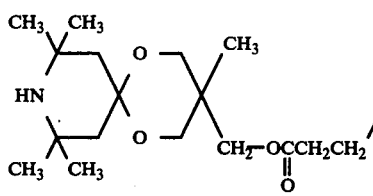
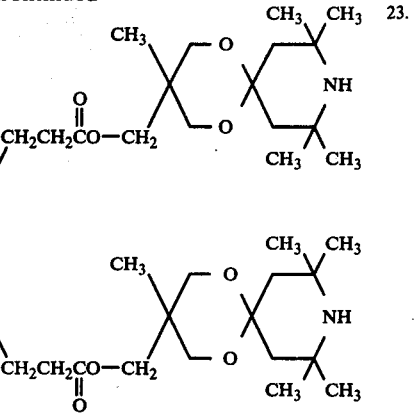

23.

The compounds in accordance with the invention are readily prepared using conventional procedures. The starting materials are either available or readily synthesized without difficulty. The corresponding 2,2,6,6-tetrasubstituted-4-hydroxy piperidine is used as a starting material for the 2,2,6,6-tetrasubstituted-4-piperidyl group $R_1$. This is reacted in the presence of an organic solvent and an alkali metal alkoxide with one or more free carboxylic acid groups of the corresponding tetracarboxylic acid ester containing one or more unesterified carboxylic acid groups, the remaining acid groups being esterified with the $R_2$ groups. The hydroxy group of the piperidine becomes esterified with the free carboxylic acid groups forming the 4-piperidinyl carboxylic acid ester of the invention:

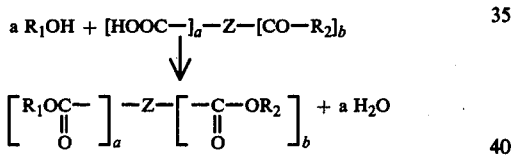

EXAMPLE I

Preparation of

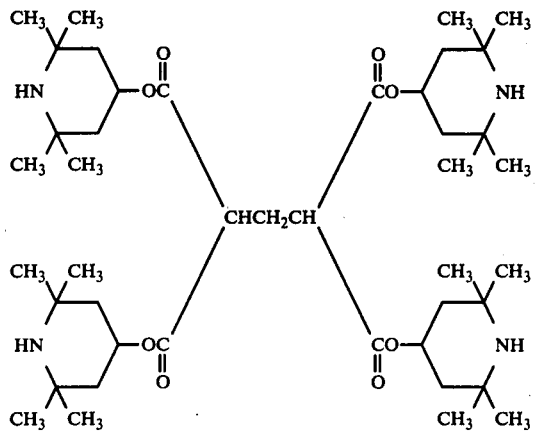

1.66 g of tetramethyl-1,1,3,3-propane tetracarboxylate, 3,74 g of 2,2,6,6-tetramethylpiperidine-4-ol and 0.5 ml of a 28% solution of $NaOCH_3$ in methanol were added to 30 ml of xylene.

The solution was heated and stirred for five hours up to 142° C., while distilling off the methanol as it was liberated. After cooling, the solution was filtered, and 100 ml of ethyl ether was added to the filtrate. The resulting solution was washed with water, dried with $K_2CO_3$. A pale yellow sticky liquid residue was obtained after distilling off the solvent. White crystals m.p. 121° to 123° C. were obtained by recrystallization of the sticky liquid from petroleum ether.

The product was shown by analysis to have the formula shown above.

EXAMPLE II

Preparation of

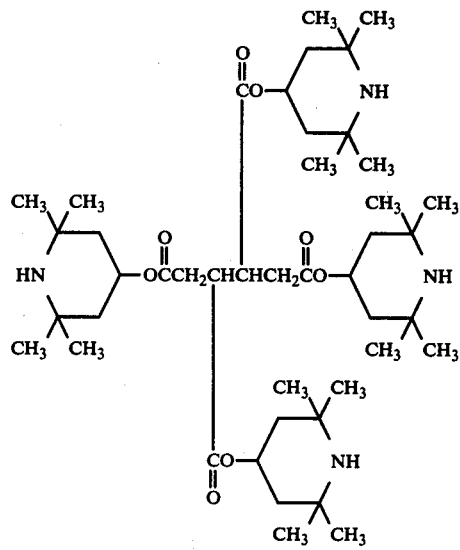

Tetramethyl-1,2,3,4-butane tetracarboxylate, 5.8 g, 15.7 g 2,2,6,6-tetramethyl-4-hydroxy piperidine, 1.5 ml tetraisopropyl titanate and 50 ml of xylene was reacted for six hours at 130° to 142° C. Then, 6 ml of a mixture of methanol and isopropanol was distilled off. The residue was cooled, washed with water, dried with $Na_2SO_4$. The sticky liquid was recrystallized from n-hexane, and 10.5 g of white crystals obtained, m.p. 138° to 142° C.

The product was shown by analysis to have the formula shown above.

EXAMPLE III

Preparation of

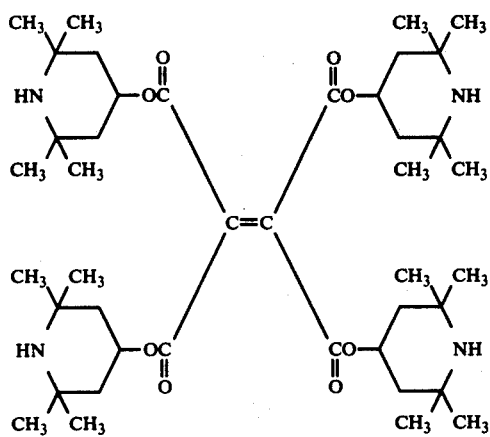

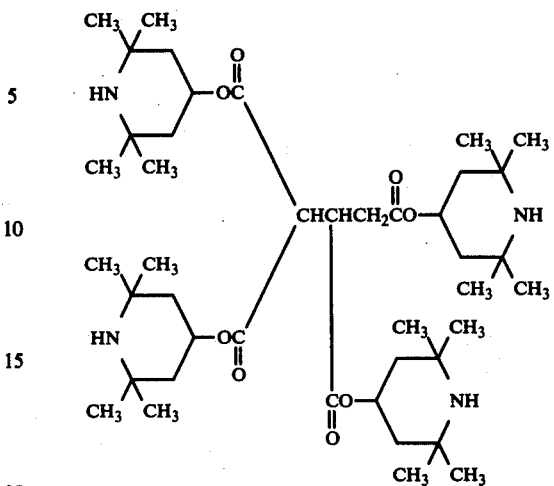

A mixture of 6.6 g tetraethyl-1,1,2,2,-ethylene tetracarboxylate, 15.0 g of 2,2,6,6-tetramethylpiperidine-4-ol, 1.0 ml of a 28% solution of NaOCH$_3$ in methanol and 100 ml of xylene was heated and stirred for three hours up to 142° C. while distilling off ethanol as it was liberated. After cooling, 200 ml of ethyl ether was added to the solution and the resulting solution washed with water, dried with K$_2$CO$_3$ and the ethyl ether removed by distillation, whereupon pale yellow crystals were obtained. The product was recrystallized from benzene n-hexane mixed solvent, and white crystals were obtained, m.p. 235° to 237° C.

The product was shown by analysis to have the formula shown above.

EXAMPLE IV

Preparation of

A mixture of 6.6 g of tetramethyl-1,1,2,4-butane tetracarboxylate, 15.0 g of 2,2,6,6-tetramethyl piperidin-4-ol, 1.0 ml of 28% solution of NaOCH$_3$ in methanol and 100 ml of xylene was heated and stirred for five hours up to 142° C., while distilling off methanol as it was liberated. After cooling, 200 ml of ethyl ether was added to the solution which was then washed with water, dried with K$_2$CO$_3$ and the solvents distilled of, leaving a pale yellow sticky liquid. White crystals m.p. 119° to 121° C. were obtained by recrystallizing the sticky liquid from petroleum ether.

An alysis showed the product corresponded to the formula shown above.

The 2,2,6,6-tetrasubstituted-4-piperidyl carboxylic acid esters of the invention are effective stabilizers to

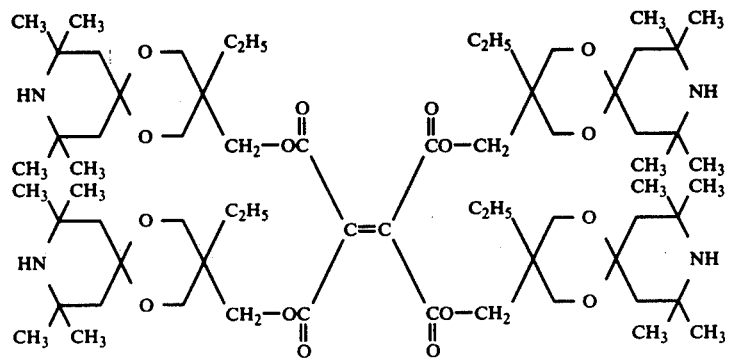

A mixture of 6.4 g tetraethyl-1,1,2,2-ethylene tetracarboxylate, 26.0 g of 9-aza-3-ethyl-3-hydroxymethyl-8,8,10,10-tetramethyl-1,5-dioxaspiro (5,5) undecane, 0.5 ml of tetraisopropyl titanate and 30 ml of xylene was reacted for six hours up to 146° C., while distilling off ethanol as it was liberated. After cooling, 150 ml of ethyl ether was added to the solution which was then washed with water, dried with K$_2$CO$_3$, and the solvents distilled off, leaving a pale yellow sticky liquid residue. White crystals m.p. 172° to 174° C. were obtained by recrystallizing the sticky liquid from benzene.

Analysis showed the product corresponded to the formula shown above.

EXAMPLE V

Preparation of enhance the resistance to deterioration due to heat and/or light of synthetic polymeric materials which are susceptible to such degradation, including polyolefins such as low density polyethylene, high density polyethylene, polypropylene, polybutylene, polyisobutylene, polypentylene, and polyisopentylene, polystyrene; polydienes, such as polybutadiene and polyisoprene; and copolymers of olefins and dienes with other ethylenically and acetylenically unsaturated monomers, such as ethylene-propylene copolymers, ethylene-butene copolymers, ethylene-pentene copolymers, ethylene-vinyl acetate copolymers, styrene-butadiene copolymers, acrylonitrile-styrene-butadiene copolymers, synthetic rubbers of all types, such as polychloroprene; polyvinyl halides, including polyvinyl chloride homopolymer, polyvinylidene chloride; and copolymers of vinyl chloride and vinylidene chloride; vinyl chloride and vinyl acetate; vinylidene chloride and vinyl acetate; and other ethylenically unsaturated monomers; polyacetals such as polyoxymethylene and polyoxyethylene; polyesters such as polyethylene glycol-terephthalic acid ester polymers; polyamides such as polyepsiloncaprolactam; polyhexamethylene adipamide and polydecamethylene adipamide; polyurethanes; and epoxy resins.

The synthetic polymer can be in any physical form, including (for example) filaments, yarns, films, sheets, molded articles, latex, and foam.

The stabilizers of the invention can be employed as the sole stabilizer or, preferably, in combination with other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organic triphosphites; organotin compounds; hindered phenols; and epoxy compounds.

With polyolefin resins there can be employed fatty acid salts of polyvalent metals, organic phosphites, phenolic antioxidants, and the higher fatty acid esters of thiodipropionic acids, such as, for example, dilauryl thiodipropionate.

With polyamide resin compositions, polyamide stabilizers such as copper salts in combination with iodides and/or phosphorus compounds and salts of divalent manganese can be used.

With synthetic rubbers and acrylonitrile butadiene styrene terpolymers, antioxidants such as hindered phenols and bis-phenols, polyvalent metal salts of the higher fatty acids, and organic phosphites can be used.

In addition, other conventional additives for synthetic polymers, such as plasticizers, lubricants, emulsifiers, antistatic agents, flameproofing agents, pigments and fillers, can be employed.

The following Examples in the opinion of the inventors represent preferred embodiments of synthetic resin compositions in accordance with the invention.

EXAMPLES 1 to 6

A group of polyvinyl chloride resin compositions was prepared having the following formulation:

| Ingredient | Parts by Weight |
| --- | --- |
| Polyvinyl chloride | 100 |
| Dioctylphthalate | 48 |
| Epoxidized soybean oil | 2.0 |
| Ca stearate | 1.0 |
| Zn stearate | 0.1 |
| Stabilizer as shown in Table I | 0.1 |

This formulation was blended and sheeted off on a two-roll mill to form sheets 1 mm thick. The light resistance of these sheets was then determined by placing strips 1 cm long in a Weather-O-Meter, and exposing them to ultraviolet light. The time in hours was then noted for the sheet to develop a noticeable discoloration and/or embrittlement, indicating deterioration due to oxidation in the presence of ultraviolet light.

This test was repeated for a total of six stabilizers in accordance with the invention, having the formulae indicated in Table I, in comparison with a control, 2,2,6,6-tetramethyl-piperidinyl-4-benzoate. The following results were obtained:

TABLE I

| Example No. | Stabilizer | Hours to Failure |
| --- | --- | --- |
| Control | 2,2,6,6-tetramethyl piperidinyl-4-benzoate | 310 |
| 1. | | 420 |

TABLE I-continued

| Example No. | Stabilizer | Hours to Failure |
|---|---|---|
| 2. | (structure) | 430 |
| 3. | (structure) | 370 |
| 4. | (structure) | 390 |

TABLE I-continued

| Example No. | Stabilizer | Hours to Failure |
|---|---|---|
| 5. | (structure) | 420 |
| 6. | (structure) | 410 |

It is apparent that each of the stabilizers in accordance with the invention is far superior to the control, a conventional ultraviolet light stabilizer for polyvinyl chloride, 2,2,6,6-tetramethyl piperidinyl-4-benzoate.

EXAMPLES 7 to 13

Polypropylene compositions were prepared using stabilizers of the invention and two of the prior art, and having the following formulation:

| Ingredient | Parts by Weight |
|---|---|
| Polypropylene | 100 |
| Distearyl pentaerythritol diphosphite | 0.2 |
| Irganox 1076[1] | 0.1 |
| Stabilizer as shown in Table II | 0.3 |

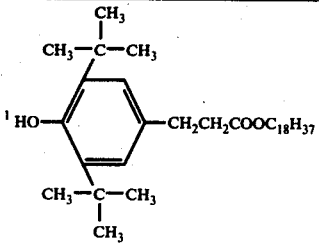

[1] $HO-\phantom{xx}-CH_2CH_2COOC_{18}H_{37}$ (with 2,6-di-tert-butyl substituents)

The composition was thoroughly blended in a Brabender Plastograph, and then compression-molded to form sheets 0.5 mm thick. Pieces 2.5 cm square were cut off from the sheets and exposed to a carbon arc in a Weather-O-Meter for 350 hours. Elongation before and after 350 hours exposure was determined, and the percent of retention of elongation is shown in Table II.

TABLE II

| Example No. | Stabilizer | % Elongation Retention |
|---|---|---|
| Control 1 | 2-hydroxy-4-octoxy benzophenone | 15.5 |
| Control 2 | bis(2,2,6,6-tetramethyl-4-piperidinyl)sebacate | 32.7 |

TABLE II-continued

| Example No. | Stabilizer | % Elongation Retention |
|---|---|---|
| 7. | (structure) | 57.3 |
| 8. | (structure) | 54.7 |
| 9. | (structure) | 59.8 |
| 10. | (structure) | 46.8 |

TABLE II-continued

| Example No. | Stabilizer | % Elongation Retention |
|---|---|---|
| 11. | [structure] | 51.2 |
| 12. | [structure] | 48.3 |
| 13. | [structure] | 55.8 |

It is apparent from the above results that the compounds of the invention are superior stabilizers in enhancing the resistance of the polypropylene polymer composition to deterioration in the presence of ultraviolet light.

EXAMPLES 14 to 20

Ethylene-vinyl acetate copolymer compositions were prepared using stabilizers of the invention and one of the prior art, and having the following formulation:

| Ingredient | Parts by Weight |
|---|---|
| Ethylene-vinylacetate copolymer | 100 |
| Stabilizer as shown in Table III | 0.2 |

The stabilizer was blended with the polymer on a two-roll mill at 120° C., and sheets 1 mm thick were than compression molded at 120° C. from the resulting blend. Pieces 2.5 cm square cut off from the sheets and exposed to ultraviolet light in a Weather-O-Meter for 500 hours. At the start and at the conclusion of the test, tensile strength of the sheet samples was determined. The results are given in Table III as % retention of the initially determined tensile strength:

TABLE III

| Ex. No. | Stabilizer | % Retention of Tensile Strength After 500 hours |
|---|---|---|
| Control | 2,-hydroxy-4-octoxybenzophenone | 72 |
| 14. | (structure) | 84 |
| 15. | (structure) | 77 |
| 16. | (structure) | 80 |
| 17. | (structure) | 80 |

TABLE III-continued

| Ex. No. | Stabilizer | % Rentention of Tensile Strength After 500 hours |
|---|---|---|
| 18. | 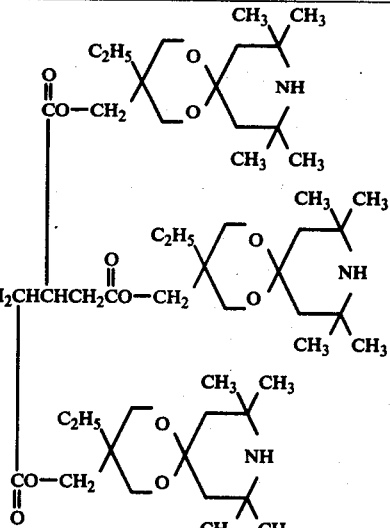 | 82 |
| 19. | 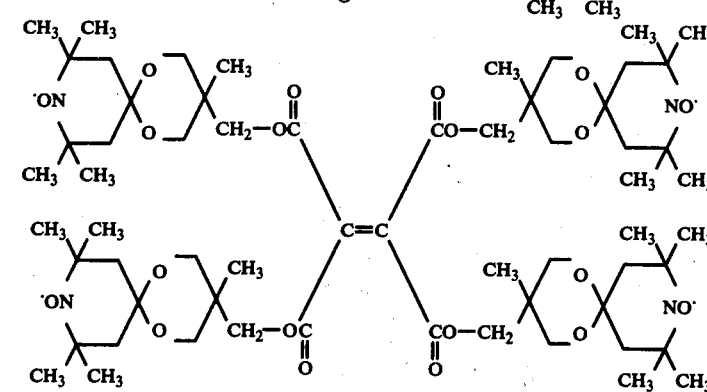 | 81 |
| 20. | 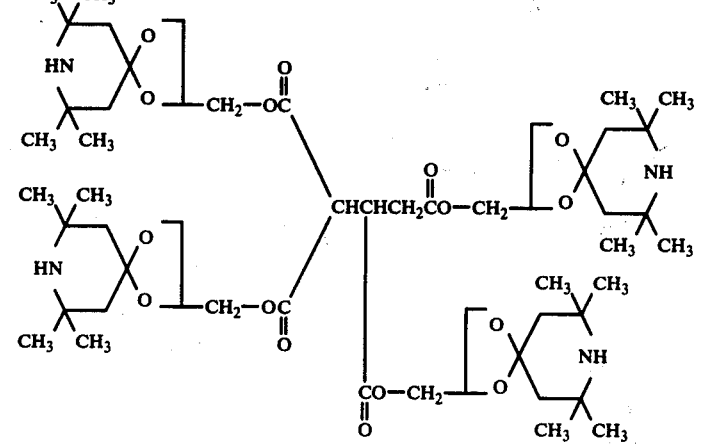 | 79 |

It is apparent from the results that the stabilizer compositions in accordance with the invention are superior to 2-hydroxy-4-octoxybenzophenone in enhancing the resistance of the ethylene-vinyl acetate copolymer to deterioration in the presence of ultraviolet light.

EXAMPLES 21 to 25

High density polyethylene compositions were prepared using stabilizers of the invention and one of the prior art, and having the following formulation:

| Ingredient | Parts by Weight |
|---|---|
| High-density polyethylene | 100 |
| 4,4'-butylidene-bis(2-tert-butyl-5-methyl-phenol) | 0.1 |
| Dilauryl thiodipropionate | 0.2 |
| Stabilizer as shown in Table IV | 0.2 |

The stabilizer was blended with the polymer on a two-roll mill and sheets 0.5 mm thick were prepared by compression molding of the blend. Pieces 2.5 cm square were cut off from the sheets, and exposed in a Weather-O-Meter to ultraviolet light. The time in hours when degradation set in, as determined by a significant discoloration and/or embrittlement, was noted as hours to failure and the results are reported in Table IV:

TABLE IV

| Example No. | Stabilizer | Hours to Failure |
|---|---|---|
| Control | 2,2,6,6-tetramethylpiperidinyl-4-benzoate | 720 |
| 21. | [structure] | 1520 |
| 22. | [structure] | 1520 |
| 23. | [structure] | 1470 |

TABLE IV-continued

| Example No. | Stabilizer | Hours to Failure |
|---|---|---|
| 24. | 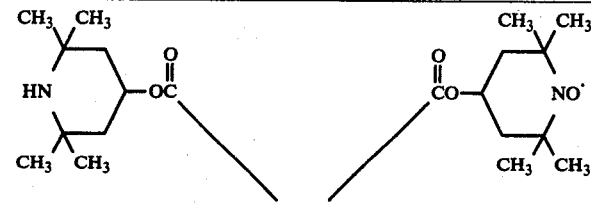 | 1490 |
| 25. | 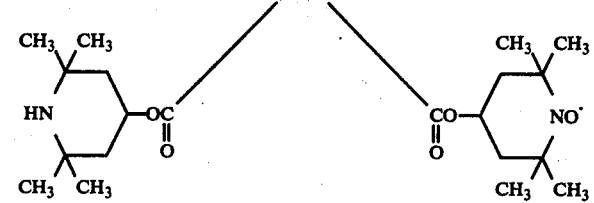 | 1340 |

The stabilizers of the invention are clearly superior to the controls in enhancing resistance of the polyethylene and degradation under ultraviolet light.

EXAMPLES 26 to 30

Five acrylonitrile-butadiene-styrene terpolymer resin compositions were prepared using stabilizers of the invention and one of the prior art, and having the following formulation:

| Ingredient | Parts by Weight |
|---|---|
| Acrylonitrile-butadiene-styrene terpolymer | 100 |
| Diphenyl decyl phosphite | 0.1 |

-continued

| Ingredient | Parts by Weight |
|---|---|
| Stabilizer as shown in Table V | 0.1 |

The stabilizer was blended with the resin on a two-roll mill, and sheets 3 mm thick were prepared by compression molding of the resulting blend. Pieces 2.5 cm square were cut off from the sheets, and subjected to ultraviolet light in a Weather-O-Meter for 800 hours. Tensile strength before and after the test exposure was determined, and the results reported as the percent of tensile strength retained, at the end of this time, in Table V.

TABLE V

| Example No. | Stabilizer | % Tensile Strength Retained |
|---|---|---|
| Control | 2-hydroxy-4-methoxybenzophenone | 73 |

TABLE V-continued
| Example No. | Stabilizer | % Tensile Strength Retained |
|---|---|---|
| 26. | 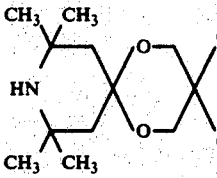 | 92 |
| 27. | 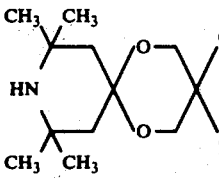 | 95 |
| 28. | 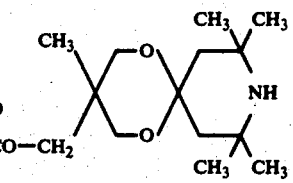 | 90 |

TABLE V-continued

| Example No. | Stabilizer | % Tensile Strength Retained |
|---|---|---|
| 29. | 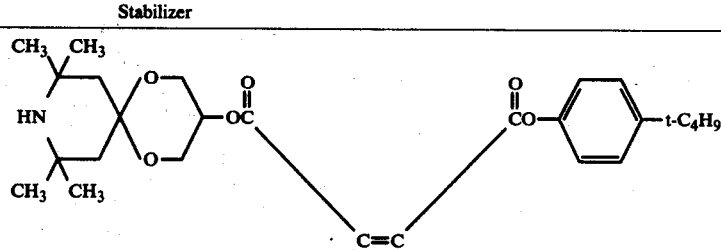 | 88 |
| 30. | 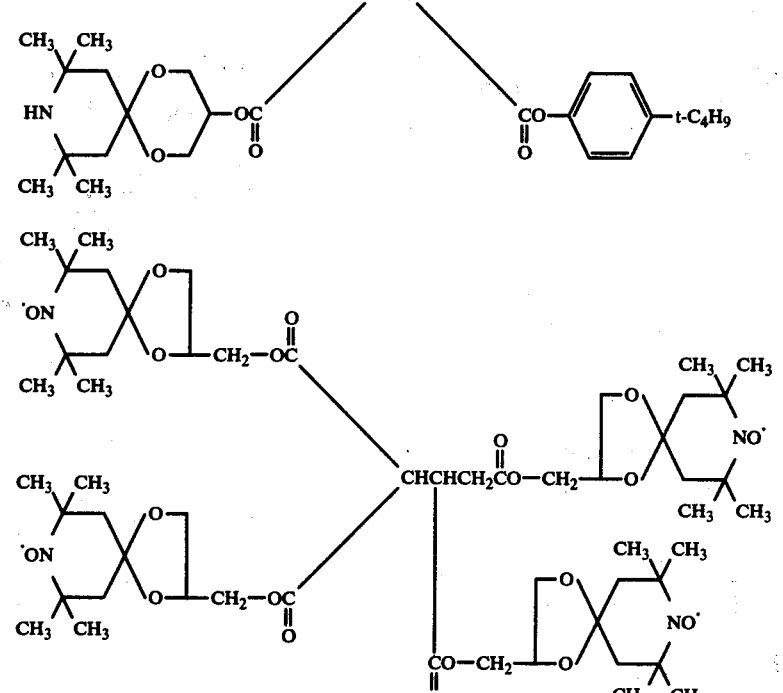 | 91 |

It is apparent from the data that the stabilizers of the invention are superior to the 2 hydroxy-4-methoxybenzophenone of the prior art.

EXAMPLES 31 to 34

Polyamide resin compositions were prepared using stabilizers of the invention and having the following formulation:

| Ingredient | Parts by Weight |
|---|---|
| Poly-epsilon-caprolactam | 100 |
| Tris (3,5-di-t-butyl-4-hydroxyphenyl)phosphite | 0.1 |
| Stabilizer as shown in Table VI | 0.2 |

The stabilizer was blended with the finely powdered poly-epsiloncaprolactam in a ball mill for fifteen minutes, and the resulting powder was then compression-molded at 250° C. to form sheets 0.5 mm thick. Pieces 2.5 cm square were cut out from the sheets, and exposed to ultraviolet light in a Weather-O-Meter for one hundred thirty hours. At the conclusion of the test period, the color of the sheets was noted. The results are given in Table VI.

TABLE VI

| Example No. | Stabilizer | Change in Color |
|---|---|---|
| | None | Yellowed |

TABLE VI-continued

| Example No. | Stabilizer | Change in Color |
|---|---|---|
| 31. | (structure) | Not changed |
| 32. | (structure) | Not changed |
| 33. | (structure) | Not changed |

TABLE VI-continued

| Example No. | Stabilizer | Change in Color |
|---|---|---|
| 34. | [Structure: complex molecule with four 2,2,6,6-tetramethyl-piperidine-linked dioxaspiro groups connected via CH₂-OCCH₂CH₂ ester linkages to a central cyclohexane ring bearing OH and H substituents] | Not changed |

The stabilizers of the invention are clearly superior to the control in enhancing resistance of the poly-epsilon-caprolactam to degradation under ultraviolet light.

EXAMPLES 35 to 39

Rubber-modified polystyrene resin formulations were prepared having the following composition:

| Ingredient | Parts by Weight |
|---|---|
| Rubber-modified polystyrene | 100 |
| BHT[1] | 0.1 |
| Ca stearate | 1.0 |
| Stabilizer as shown in Table VII | 0.25 |

[1] 
$$\text{BHT} = \text{2,6-di-tert-butyl-4-methylphenol}$$
(structure: phenol with two C(CH₃)₃ groups ortho to OH and CH₃ para)

The compositions were extruded to form pellets, and then test pieces were molded from the pellets by injection molding at 230° C. The test pieces were irradiated with ultraviolet light for three hundred twenty hours in a Weather-O-Meter. Tensile strength before and after exposure was determined, and the percent tensile strength retained after the exposure is given in Table VII:

TABLE VII

| Example No. | Stabilizer | % Retention of Tensile Strength |
|---|---|---|
| Control | bis(2,2,6,6-tetramethyl-4-piperidinyl)sebacate | 65.3 |
| 35. | [Structure: four 2,2,6,6-tetramethyl-4-piperidinyl ester groups connected through CHCH₂CH central linkage] | 74.8 |

TABLE VII-continued

| Example No. | Stabilizer | % Retention of Tensile Strength |
|---|---|---|
| 36. | (structure) | 70.5 |
| 37. | (structure) | 75.2 |
| 38. | (structure) | 71.4 |

TABLE VII-continued

| Example No. | Stabilizer | % Retention of Tensile Strength |
|---|---|---|
| 39. | 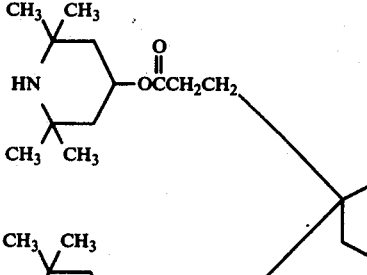 | 73.6 |

It is apparent that the stabilizers of the invention are effective ultraviolet light stabilizers for polystyrene-rubber mixtures.

In addition to the above Examples, the compounds of the invention were incorporated in resin compositions comprising (1) a polyurethane made from toluene diisocyanurate and alkylene polyol;
(2) a polycarbonate made from Bisphenol A and phosgene;
(3) polyethylene terphthalate; and
(4) a polyphenylene oxide made from 2,6-dimethylphenol.

The stabilizing effect of the stabilizer of this invention was superior to known light stabilizers in each case.

Having regard to the foregoing disclosures, the following is claimed as the inventive and patentable embodiments thereof:

1. A 2,2,6,6-tetramethyl-4-piperidyl carboxylic acid ester of an aliphatic or cycloaliphatic tetracarboxylic acid having the general formula:

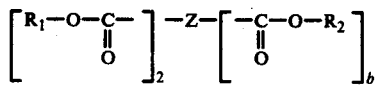

wherein:
$R_1$ is selected from the group consisting of

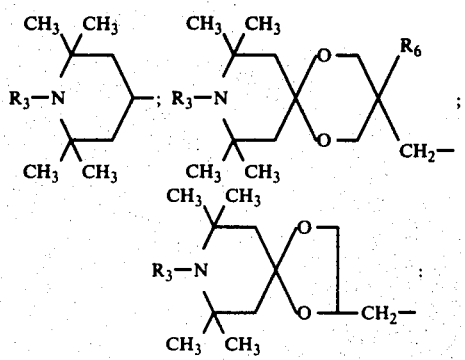

-continued

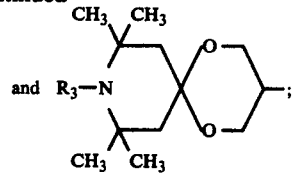

and when a is 2, 3, or 4, the $R_1$ groups can be the same or different;

$R_2$ is selected from the group consisting of hydrogen; alkyl; alkenyl; cycloalkyl; alkcycloalkyl; cycloalkalkyl; aryl; aralkyl; and alkaryl; and when b is 2 or 3, the $R_2$ groups can be the same or different;

$R_3$ is selected from the group consisting of hydrogen and O;

$R_6$ is lower alkyl;

a is selected from the group consisting of 1, 2, 3 and 4;

b is selected from the group consisting of 0, 1, 2 and 3;

a + b is equal to 4; and

Z is a tetravalent aliphatic or cycloaliphatic radical having from two to about twenty-four carbon atoms and carrying four

groups, where R is $R_1$ or $R_2$, and can include from one to three hydroxyl groups OH.

2. A compound according to claim 1 in which a is 4 and b is zero.

3. A compound according to claim 1 in which a is 2 and b is 2.

4. A compound according to claim 1 in which $R_3$ is hydrogen.

5. A compound according to claim 1 in which $R_3$ is O.

6. A compound according to claim 1 in which $R_2$ is alkyl having from one to six carbon atoms.

7. A compound according to claim 1 in which $R_2$ is phenalkyl having from seven to about fourteen carbon atoms.

8. A compound according to claim 1 in which $R_1$ is

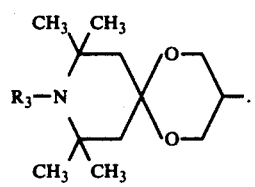

9. A compound according to claim 1 in which $R_1$ is

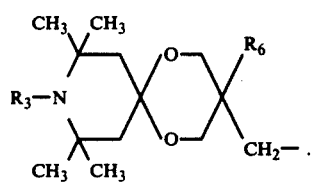

10. A compound according to claim 1 in which $R_1$ is

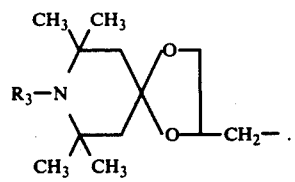

11. A compound according to claim 1 in which $R_1$ is

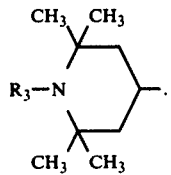

12. A compound according to claim 1 in which Z is alkylene having from two to about twenty-four carbon atoms.

13. A compound according to claim 12 in which Z is propylene >CHCH$_2$CH<.

14. A compound according to claim 12 in which Z is ethylidene >C=C<.

15. A compound according to claim 1 in which Z is cycloalkylene having from about four to about twenty-four carbon atoms.

16. A compound according to claim 15 in which Z is 1-hydroxy-2,2,6,6-tetraalkylene cyclohexylene.

17. A compound according to claim 1 having the formula:

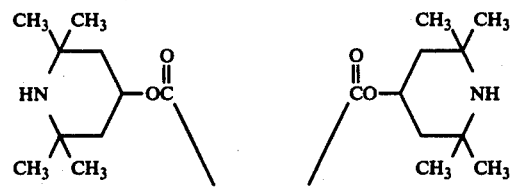

18. A compound according to claim 1 having the formula:

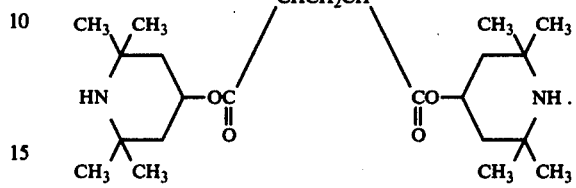

19. A compound according to claim 1 having the formula:

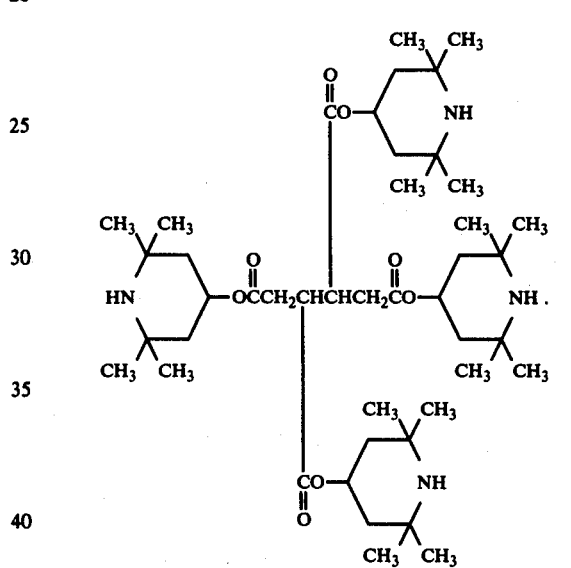

20. A compound according to claim 1 having the formula:

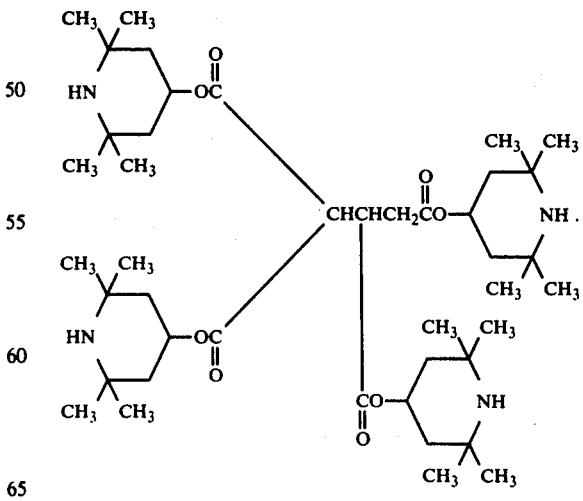

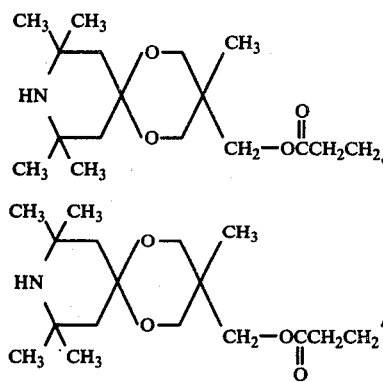 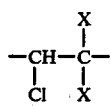 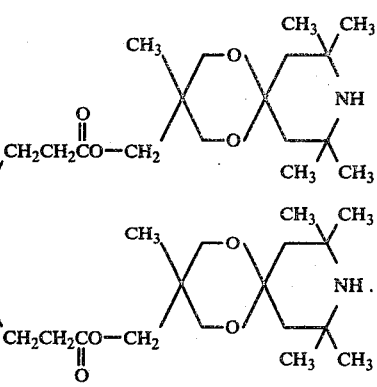

21. A polyvinyl chloride resin composition having improved resistance to deterioration when heated at 350° F., comprising a polyvinyl chloride resin formed at least in part of the recurring group:

$$-CH-\underset{\underset{X}{|}}{\overset{\overset{X}{|}}{C}}-$$
$$\phantom{-CH-}\;Cl$$

and having a chlorine content in excess of 40%, where X is either hydrogen or chlorine; and a compound in accordance with claim 1.

22. A polyvinyl chloride resin composition in accordance with claim 21, in which the polyvinyl chloride resin is polyvinyl chloride homopolymer.

23. A polyvinyl chloride resin composition in acordance with claim 21, in which the polyvinyl chloride resin is a copolymer of vinyl chloride and vinyl acetate.

24. An olefin polymer composition having improved resistance to deterioration comprising an olefin polymer selected from the group consisting of polymers of alpha-olefins having from two to six carbon atoms and polystyrene, and a compound in accordance with claim 1.

25. An olefin polymer composition in accordance with claim 24 wherein the polyolefin is polypropylene.

26. An olefin polymer composition in accordance with claim 24 wherein the polyolefin is polyethylene.

27. An acrylonitrile-butadiene-styrene polymer having its resistance to deterioration when heated at 300° F. and above enhanced by a compound in accordance with claim 1.

28. A synthetic rubbery diene polymer composition having improved resistance to deterioration comprising a rubbery diene polymer and a compound in accordance with claim 1.

29. A polyamide resin composition having improved resistance to deterioration comprising an polyamide resin and a compound in accordance with claim 1.

30. An ethylene-vinyl acetate copolymer composition having improved resistance to deterioration comprising a ethylene-vinyl acetate copolymer and a compound in accordance with claim 1.

* * * * *

UNITED STATES PATENT AND TRADEMARK OFFICE
CERTIFICATE OF CORRECTION

PATENT NO. : 4,136,081 - Page 1 of 10
DATED : January 23, 1979
INVENTOR(S) : Motonobu Minagawa et al It is certified that error appears in the above-identified patent and that said Letters Patent are hereby corrected as shown below:

Abstract, line 37 : "O;" should be --O·;--
Column 6, line 46 : "cabon" should be --carbon--.
Column 8, line 18 : "O;" should be --O·;--
Column 19, formula 18:

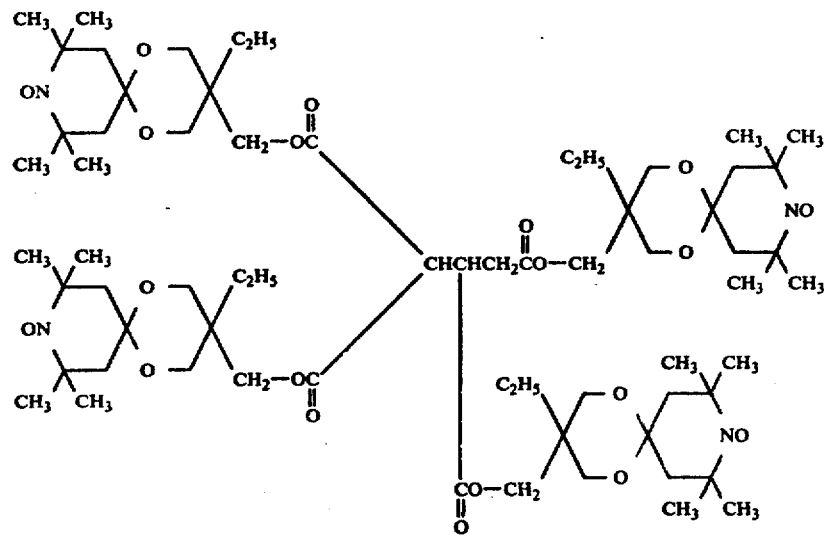

should be

UNITED STATES PATENT AND TRADEMARK OFFICE
CERTIFICATE OF CORRECTION

PATENT NO. : 4,136,081

DATED : January 23, 1979

INVENTOR(S) : Motonobu Minagawa et al

It is certified that error appears in the above-identified patent and that said Letters Patent are hereby corrected as shown below:

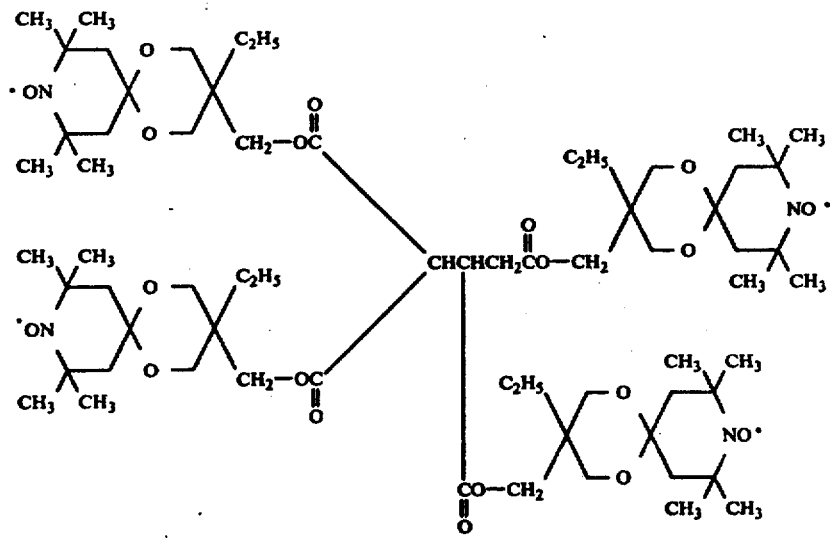

UNITED STATES PATENT AND TRADEMARK OFFICE
CERTIFICATE OF CORRECTION

PATENT NO. : 4,136,081

DATED : January 23, 1979

INVENTOR(S) : Motonobu Minagawa et al

It is certified that error appears in the above-identified patent and that said Letters Patent are hereby corrected as shown below:

Column 21, formula 20:

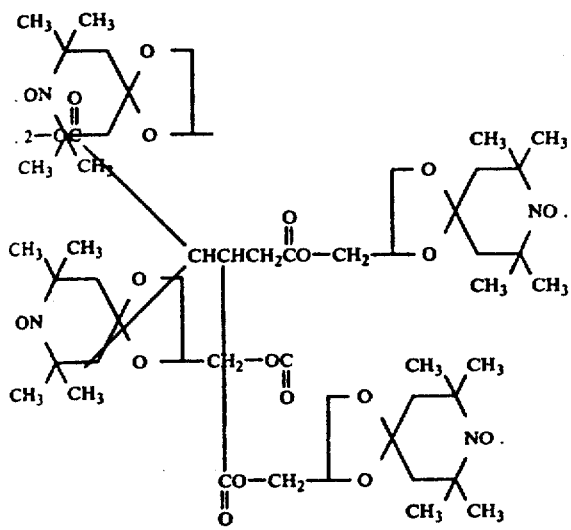

should be

UNITED STATES PATENT AND TRADEMARK OFFICE
CERTIFICATE OF CORRECTION

PATENT NO. : 4,136,081
DATED : January 23, 1979
INVENTOR(S) : Motonobu Minagawa et al It is certified that error appears in the above-identified patent and that said Letters Patent are hereby corrected as shown below:

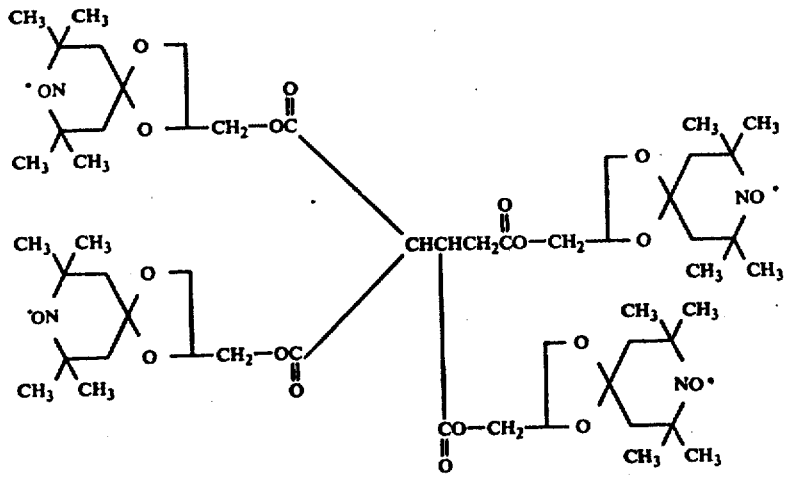

Column 23, line 68: "142°C" should be --140°C--.
Column 26, line 33 : "An alysis" should be -- Analysis --.

UNITED STATES PATENT AND TRADEMARK OFFICE
CERTIFICATE OF CORRECTION

PATENT NO. : 4,136,081

DATED : January 23, 1979

INVENTOR(S) : Motonobu Minagawa et al

Page 5 of 10

It is certified that error appears in the above-identified patent and that said Letters Patent are hereby corrected as shown below:

<u>Column 29, formula 3</u> :

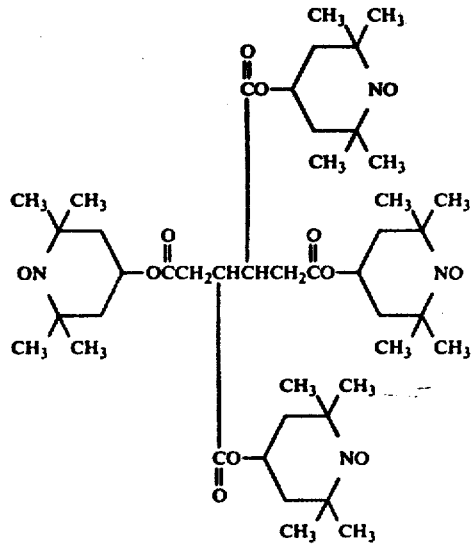

should be

UNITED STATES PATENT AND TRADEMARK OFFICE
CERTIFICATE OF CORRECTION

PATENT NO. : 4,136,081

DATED : January 23, 1979

INVENTOR(S) : Motonobu Minagawa et al

It is certified that error appears in the above-identified patent and that said Letters Patent are hereby corrected as shown below:

3.

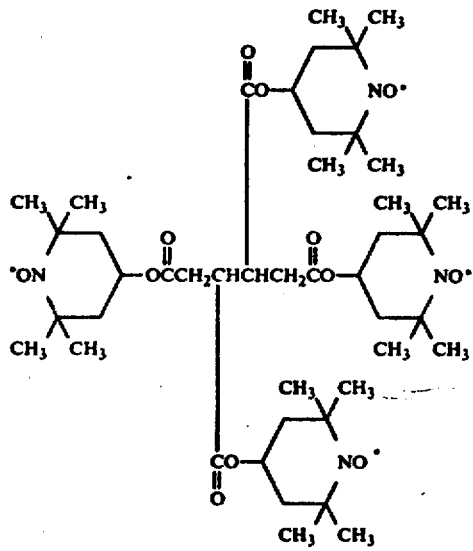

UNITED STATES PATENT AND TRADEMARK OFFICE
CERTIFICATE OF CORRECTION

PATENT NO. : 4,136,081

DATED : January 23, 1979

INVENTOR(S) : Motonobu Minagawa et al

It is certified that error appears in the above-identified patent and that said Letters Patent are hereby corrected as shown below:

Columns 33 and 34, formulas 8 and 9:

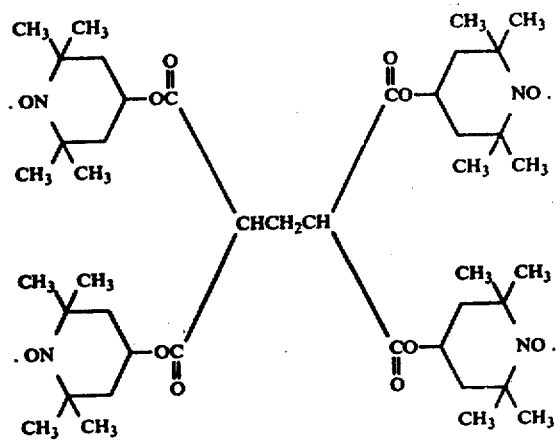

should be

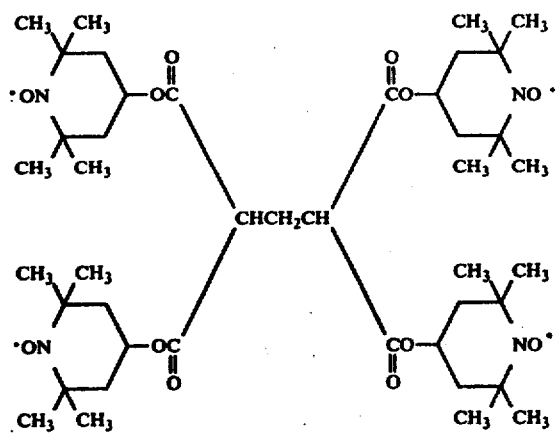

UNITED STATES PATENT AND TRADEMARK OFFICE
CERTIFICATE OF CORRECTION

PATENT NO. : 4,136,081
DATED : January 23, 1979
INVENTOR(S) : Motonobu Minagawa et al It is certified that error appears in the above-identified patent and that said Letters Patent are hereby corrected as shown below:

Column 37, Example 16 :

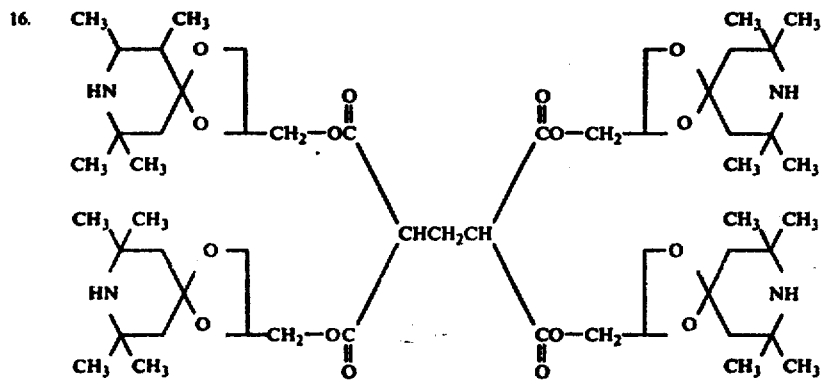

should be

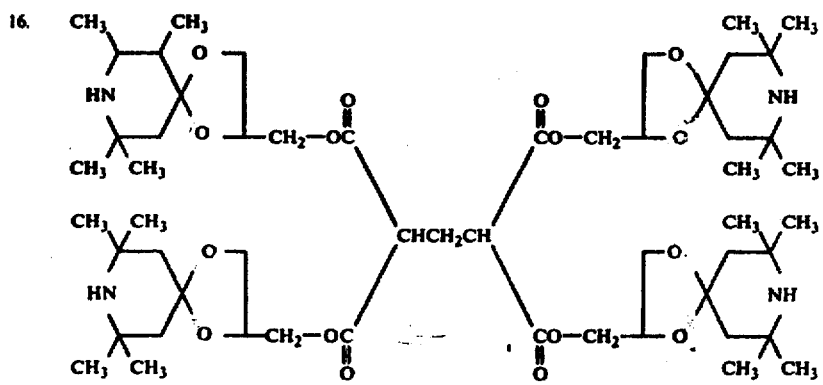

UNITED STATES PATENT AND TRADEMARK OFFICE
CERTIFICATE OF CORRECTION

PATENT NO. : 4,136,081
DATED : January 23, 1979
INVENTOR(S) : Motonobu Minagawa et al It is certified that error appears in the above-identified patent and that said Letters Patent are hereby corrected as shown below:

Column 43, Example 25 :

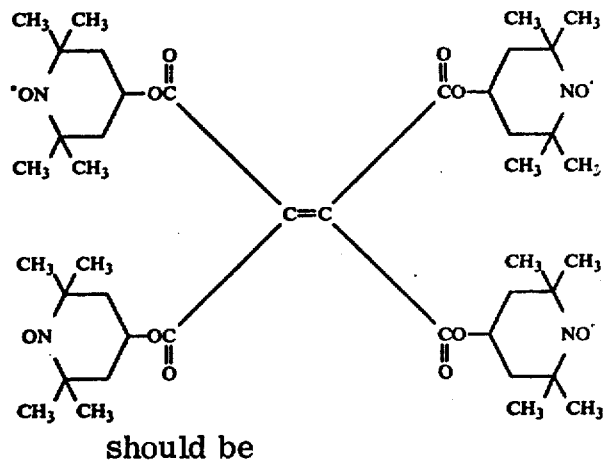

should be

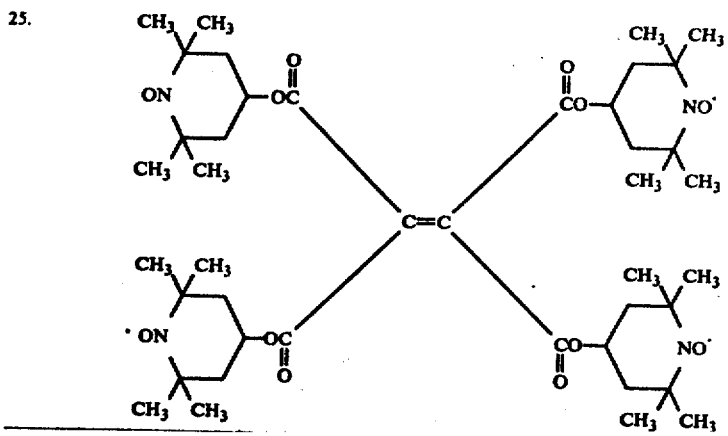

UNITED STATES PATENT AND TRADEMARK OFFICE
CERTIFICATE OF CORRECTION

PATENT NO. : 4,136,081
DATED : January 23, 1979
INVENTOR(S) : Motonobu Minagawa et al It is certified that error appears in the above-identified patent and that said Letters Patent are hereby corrected as shown below:

Column 56, line 39 : "O;" should be --O˙;--
Column 56, line 61 : "O." should be --O˙."--

Signed and Sealed this

Nineteenth Day of February 1980

[SEAL]

Attest:

SIDNEY A. DIAMOND

Attesting Officer     Commissioner of Patents and Trademarks